United States Patent [19]

Mizumoto

[11] 3,764,754

[45] Oct. 9, 1973

[54] CIRCUIT BILATERALLY EMPLOYABLE IN CARTRIDGE TYPE TAPE RECORDER FOR TWO CHANNEL AND FOUR CHANNEL OPERATIONS

[75] Inventor: Yoshiro Mizumoto, Iwaki, Japan

[73] Assignee: Alps Motorola, Inc., Tokyo, Japan

[22] Filed: Apr. 11, 1972

[21] Appl. No.: 243,006

[52] U.S. Cl.179/100.2 CA, 179/1 GQ, 179/100.2 Z, 274/4 G

[51] Int. Cl.. G11b 21/10, G11b 23/04, G11b 23/18

[58] Field of Search............ 179/100.2 Z, 100.2 CA, 179/100.1 TD, 1 GQ, 1 G, 1 GA, 100.2 MD, 100.2 R; 242/55.19 A; 274/4 G

[56] References Cited

UNITED STATES PATENTS

| | | | |
|---|---|---|---|
| 3,640,538 | 2/1972 | Tolar | 179/100.2 CA |
| 3,374,315 | 3/1968 | Gladwin, Jr. | 179/100.1 TD |
| 3,632,886 | 1/1972 | Scheiber | 179/1 GQ |
| 3,656,761 | 4/1972 | Laschenski | 179/100.2 Z |
| 3,532,347 | 10/1970 | Parsons | 179/100.2 CA |
| 3,552,751 | 1/1971 | Kelso | 274/4 G |
| 3,426,162 | 2/1969 | Matsumoto | 179/100.2 CA |

*Primary Examiner*—Vincent P. Canney
*Assistant Examiner*—Alfred H. Eddleman
*Attorney*—Foorman L. Mueller et al.

[57] ABSTRACT

Two to four channel switching circuitry for a cartridge tape player using a magnetic tape head having four pick-up areas and which is movable to two positions with respect to the tape tracks on the tape in a cartridge received in the player includes four amplifier circuits, each associated with a pick-up area on the tape head and each of which is coupled to a speaker. A switch is operated in accordance with the receipt of a two or four channel cartridge in the player to connect two of the speakers to a first amplifier circuit and the other two speakers to a second amplifier circuit when in the two channel mode or each of the amplifier circuits to a corresponding one of the speakers when in the four channel mode. In the two channel mode, operation of the amplifier circuits is controlled by a rotary switch rotatable with a cam member included in a tape head indexing assembly. A first or second pair of amplifier circuits is activated in the two channel mode in accordance with the position of the rotary switch wiper.

5 Claims, 2 Drawing Figures

CIRCUIT BILATERALLY EMPLOYABLE IN CARTRIDGE TYPE TAPE RECORDER FOR TWO CHANNEL AND FOUR CHANNEL OPERATIONS

BACKGROUND

This invention relates to switching circuitry for use in a cartridge type tape player for operating the player in a four or two channel mode of operation.

With the advent of four channel sound, it has become necessary to provide tape player equipment for reproducing sound recorded on four channel tape cartridges. It is desirable that the tape player equipment be designed not only to play back four channel tapes, but to play back stereophonic or two channel tapes as well. Furthermore, it is advantageous to provide in such a tape player an arrangement which would operate the player to a four or two channel mode in accordance with the type of tape cartridge received in the player so that one operating the player would not be required to set the mode of the player manually.

SUMMARY

Accordingly, it is an object of the present invention to provide new and improved switching circuitry for use in a cartridge tape player for operating the player in a four or two channel mode in accordance with the type of cartridge received in the player.

It is another object of the invention to provide circuitry of the above described type which is relatively simple in construction and efficient in operation.

Briefly, a preferred embodiment of the two-four channel switching circuitry according to the invention includes four amplifier arrangements each coupled electrically to a magnetic pick-up of a four channel magnetic tape head and to a corresponding speaker or sound reproducing device. Each of the amplifier arrangements is also connected to a rotary switch through a two or four channel switch, the latter of which is operated to one of two positions; i.e., two or four channel setting, in accordance with the receipt of a two or four channel cartridge in the player, respectively. The rotary switch is rotatable with a tape head indexing cam operable to move the tape head to upper and lower positions with respect to the magnetic tape in the cartridge inserted into the player.

Upon insertion of a four channel cartridge into the player, each of the amplifier arrangements coupled to a tape head pick-up is grounded to forward bias a diode included in the amplifier arrangement for operation of the latter, thereby transferring the output signal from the amplifier to a corresponding speaker.

If a two channel cartridge is recieved in the player, only two of the pick-up areas of the tape head are used, thus, only those corresponding amplifier arrangements are provided with a ground potential for operation thereof. In the latter case, the amplified output of the two operational channels is reproduced at first and second speakers and the sound from the other channel is reproduced as a second pair of speakers. In the latter case, the two operational channels used are changed depending upon the positioning of the wiper on the rotary switch. The speakers used, however, remain the same during stereophonic reproduction.

DETAILED DESCRIPTION

Figure 1:
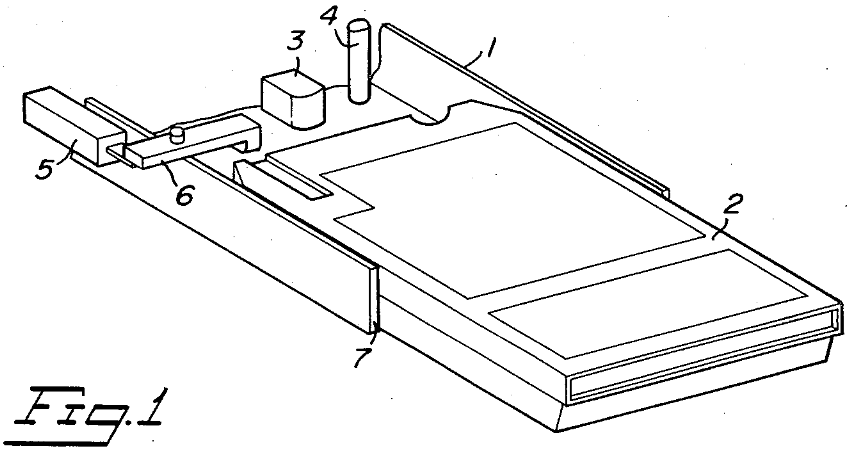
FIG. 1 is a perspective view of a portion of a cartridge tape player incorporating the automatic switching circuitry according to the invention.

Referring now to FIG. 1 of the drawing, numeral 1 designates the main body of the tape player. Numeral 2 designates a tape cartridge inserted in the main body 1, and numeral 3 designates a magnetic tape head mounted on the main body 1 for movement to two positions with respect to the tape (not shown) in the cartridge, by means of a rotary cam (not shown). The tape head includes four magnetic pick-ups for obtaining four signals simultaneously from the tape within the cartridge. Numeral 4 designates a capstan shaft for driving the tape through the cartridge. Numeral 6 designates a lever which operates a depressible switch 5 when a two channel tape cartridge is inserted in the tape player main body 1, but which does not operate the switch 5 when a four channel tape cartridge is inserted in the main body. Numeral 7 designates a groove formed in the four channel tape cartridge to avoid engagement of lever 6 and thus operation of the last-mentioned switch. The groove 7 is eliminated in a two channel tape cartridge.

Figure 2:
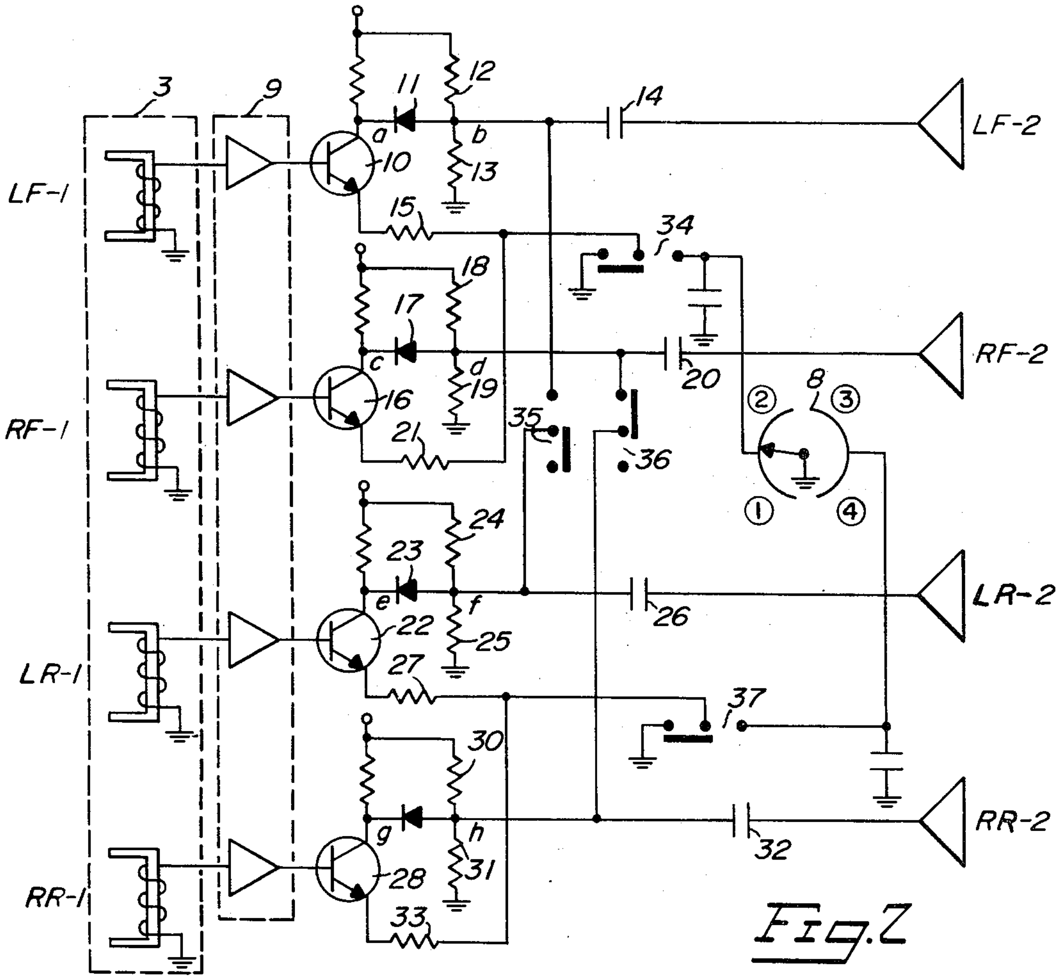
FIG. 2 is a schematic diagram of the automatic switching circuitry according to the invention.

Referring to FIG. 2, the magnetic tape head 3 is shown as including four pick-ups. A switch 8 is provided which rotates concentrically with the tape head indexing cam as the latter is rotated for raising and lowering the magnetic head 3. Also provided are first amplifier stages all of which are designated by the numeral 9, which amplify the input signals from respective ones of the magnetic tape head pick-ups. In the circuit designated LF-1, a transistor an electron control valve such as 10 is included in a second stage of amplification is provided and is connected at the collector thereof to a unidirectional current conducting device such as switching diode 11. Bias adjusting resistors 12 and 13 are connected to the diode at point *b*. A coupling capacitor 14 is also connected between the output of the circuit, designated LF-2, and point *b*. A resistor 15 is connected to the emitter of transistor 10.

In the circuit of RE-1, 16 designates a transistor for the second stage of amplification and 17 designates a switching diode similar to diode 11 of stage LF-1. Numerals 18 and 19 designate bias adjusting resistors for the diode 17 and 20 designates a coupling connected thereto. Numeral 21 designates an emitter resistor for the transistor 16.

In the circuit of LR-1, a transistor 22 is provided in the second stage of amplification and as in the last-mentioned circuits, a switching diode 23 is connected between the collector and a pair of bias adjusting resistors 24 and 25. Numeral 26 designates a coupling capacitor and numeral 27 designates a resistor connected to the emitter of transistor 22.

In the circuit of RR-1, numeral 28 designates a transistor for a second stage of amplification of the circuit, and numeral 29 designates the switching diode connected thereto. Bias adjusting resistors 30 and 31 are provided for the diode. A coupling capacitor 32 and a resistor 33 are likewise provided as in the case of the previously described circuits.

Two to four channel transfer contacts 34, 35, 36 and 37 are provided and are operated by switch 5 described heretofore. Operation of the transfer contacts in accordance with the receipt of a cartridge in the tape player changes the amplifier circuitry from two to four channel operation and vice versa. The panel switch 8 described heretofore is connected to contacts 34 and 37.

Operation of the arrangement is as follows. It is assumed that the contactor or wiper of the panel switch 8 is at the position 1 when the magnetic tape head 3 is at the upper position. The contactor is brought into position 2 when the cam is rotated and the tape head is lowered. Thereafter, the contactor is brought into the positions 3 and 4 when the magnetic tape head is again raised and lowered, respectively.

Upon insertion of a four channel tape cartridge into the main body of the player, switch 5 remains unoperated so that contacts 34, 35, 36 and 37 are maintained in the four channel position as shown in FIG. 2. If the switch 8 is at position 1 or 2, the emitter of the amplifier transistor 10 is grounded through the series connected emitter resistor 15 and the ground connected to transfer switch 34. At this time, the potential at point *a* is made lower than that of point *b* and the switching diode 11 is brought into the forward biased condition. As a result, the signal in the circuit LF-1 taken from the tape is amplified by amplifier 9 and the subsequent amplifier stage including transistor 10. The output therefrom is passed to a speaker or the like sound reproducing device connected at output LF-2.

Likewise, the signal in the circuit RF-1 is amplified and is passed to the point RF-2 through the forward biased switching diode 17. As can be seen in FIG. 2, a ground potential from contacts 34 is also provided to transistor 16. The signals picked up from the tape in the circuit LR-1, RR-1 are also amplified in the same manner and the outputs therefrom are passed to points LR-2 and RR-2, respectively. Ground potential to transistors 22 and 28 are provided thereto through contacts 37.

In the case wherein a two channel tape cartridge is inserted into the tape player main body 1, the lever 6 in FIG. 1 is engaged by the cartridge and is rotated to move switch 5 so that the transfer contacts 34, 35, 36 and 37 are transferred to the two channel setting.

In the event the panel switch 8 is in the position 1 or 2 as shown in FIG. 2 of the drawing, the emitter of transistor 10 in the circuit LF-1, which is connected in series with the emitter resistor 15 and the wiper of the channel transferring contacts 34, is grounded through the wiper of the panel switch 8. As a result, the switching diode 11 is forward biased and the signal of the circuit LF-1 is amplified in the amplifier 9 and the subsequent amplifier including transistor 10 to pass the output therefrom to point LF-2.

In the circuit LR-1, the transfer switch connects the emitter of transistor 22 to the side of panel switch 8 not being engaged by the wiper, therefore the circuit is open. Consequently, the potential at point *e* is higher than that at point *f* and the switching diode 23 is reversed biased. Thus, the signal in the signal LR-1 is blocked by diode 23 from output LR-2. Contacts 35, however, which are in the two channel position, are closed to pass the signal from LF-1 to the output LR-2. Consequently, the amplified signal from LF-1 appears both at LF-2 and LR-2.

In the same manner, the signal in the circuit RF-1 is amplified by amplifier 9 and a subsequent amplifier stage including transistor 16 and is thereafter passed to the output RF-2 and through switch 36 to the output RR-2.

When the panel switch 8 is placed in position 3 or 4, the switching diodes 11 and 17 in circuits LF-1 and RF-1 are reversed biased and the switching diodes 23 and 29 in the circuits LR-1 and RR-1 are forward biased. Thus, the signal developed at LR-1 is amplified and transferred to outputs LF-2 and LR-2, and the signal developed in circuit RR-1 is amplified and transferred to the point RF-2 and RR-2.

In summary, when the four channel tape cartridge is inserted into the tape player main body 1, signals in the circuits LF-1, RF-1, LR-1 and RR-1 are amplified and the outputs are transferred to the circuits LF-2, RF-2, LR-2 and RR-2, respectively. However, when the two channel tape cartridge is inserted into the tape player main body 1, the transfer contacts 34, 35, 36 and 37 are positioned to the two channel position and a signal in the circuit LF-1 is amplified and transferred to outputs LF-2 and LR-2 and the signal in circuit RF-1 is amplified and transferred to the circuits RF-2 and RR-2 in the case where the switch 8 is in the 1 or 2 position. Likewise, in the case where the switch 8 is in the 3 or 4 position, a signal is developed in circuit LR-1 and amplified and transferred to outputs LR-2 and LF-2, and the signal in RR-1 is amplified and transferred to the circuits RR-2 and RF-2. Because the circuit according to the invention makes use of diodes 11, 17, 23 and 29, accurate and efficient switching of the circuits is realized.

I claim:

1. A cartridge type tape player adapted to receive and play two and four channel tape cartridges including in combination, a magnetic tape head having four magnetic pick-up areas, tape head indexing means for moving said tape head to one of two positions with respect to the tape for aligning said pick-up areas with predetermined tape channels thereon, amplifier means including four amplifier circuits each connected to one of said pick-up areas on said tape head and to an output for receiving signals from said amplifier circuit for audible reproduction, each said amplifier circuit including an electron control valve having an input connected to a respective magnetic pick-up and an output, a plurality of unidirectional current conducting devices, each device being connected between a respective output of one of said electron valves and an associated output for audio reproduction, switching means coupled to said electron control valves and having a first portion operable between first and second positions in accordance with the receipt of said two or four channel tape cartridges in said player respectively, and a second portion operable between one of two predetermined positions by said tape head indexing means, with movement of said first portion of said switching means to said second position in response to the receipt of a four channel cartridge in said player, each said electron control valve is energized through said switch means thereby forward biasing said unidirectional current conducting device to pass output signals from each of said respective amplifier circuits, and with movement of said first portion of said switching means to said first position in response to the receipt of a two channel cartridge in said player, and operation of said second portion of said switching means to a first predetermined position by said head indexing means energizes a first pair of said electron control valves through said switch means thereby forward biasing each said unidirectional current conducting device connected to said first pair of electron control valves to pass output signals from each of said respective amplifier circuits, and operation of said second portion of said switching means to said second predetermined position by said head indexing means energizes the other pair of electron control valves through said switch means thereby forward biasing each said unidirectional current conducting device connected to said second pair of electron control valves to pass output signals from each of their respective amplifier circuits.

2. The cartridge tape player of claim 1 wherein said electron control valve is a transistor having input, output and common electrodes, and said unidirectional current conducting device is a diode, said input electrode being connected to one of said magnetic pick-up areas, said output electrode connected to said diode and said common electrode connected to said switch means.

3. The cartridge tape player of claim 2 further including in combination, bias circuit means connected to each of said transistor and diode, said common electrode of each said transistor being selectively connected through said switch means to complete a circuit thereby causing bias current to flow from said bias circuit means and through said transistor and said switch means to forward bias said diode.

4. The cartridge tape player of claim 2 wherein with said two channel cartridge being inserted in said player, said head indexing means operates said second portion of said switching means to said first predetermined position, with said tape head being moved by said head indexing means to said second position from said first position, and said head indexing means operates said second portion of said switching means to said second predetermined position with said head indexing means next moving said tape head to said first and second positions.

5. The cartridge tape player of claim 4 wherein with said two channel cartridge being inserted in said player, said first portion of said switching means is operated to connect the remaining two outputs for receiving signals from said amplifier circuits to respective ones of said pair of amplifier circuits connected to said first pair of transistors with said second portion of said switching means in said first predetermined position, and said remaining two outputs being connected to said pair of amplifier circuits connected to said second pair of transistors with said second portion of said switching means in said second predetermined position.

* * * * *